United States Patent
Tokuda

(10) Patent No.: US 9,745,937 B2
(45) Date of Patent: Aug. 29, 2017

(54) CONTROL DEVICE FOR INTERNAL COMBUSTION ENGINE

(75) Inventor: Takeshi Tokuda, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 132 days.

(21) Appl. No.: 14/343,596

(22) PCT Filed: Oct. 6, 2011

(86) PCT No.: PCT/JP2011/073044
§ 371 (c)(1),
(2), (4) Date: Mar. 7, 2014

(87) PCT Pub. No.: WO2013/051123
PCT Pub. Date: Apr. 11, 2013

(65) Prior Publication Data
US 2014/0209064 A1    Jul. 31, 2014

(51) Int. Cl.
*F02M 63/02* (2006.01)
*F02D 41/38* (2006.01)
*F02D 41/00* (2006.01)
*F02D 41/22* (2006.01)

(52) U.S. Cl.
CPC ..... *F02M 63/0245* (2013.01); *F02D 41/0002* (2013.01); *F02D 41/38* (2013.01);
(Continued)

(58) Field of Classification Search
CPC ............ F02D 41/3863; F02D 41/0002; F02D 2041/226; F02D 19/0684; F02M 37/0052;
(Continued)

(56) References Cited

U.S. PATENT DOCUMENTS

| | | | | |
|---|---|---|---|---|
| 5,785,025 A | * | 7/1998 | Yoshiume | F02D 33/003 123/458 |
| 7,350,510 B2 | * | 4/2008 | Tomatsuri | F02D 41/003 123/514 |
| 2008/0156295 A1 | | 7/2008 | Suzuki et al. | |

FOREIGN PATENT DOCUMENTS

| | | |
|---|---|---|
| CN | 101061304 A | 10/2007 |
| CN | 102192027 A | 9/2011 |

(Continued)

OTHER PUBLICATIONS

International Preliminary Report on Patentability issued Apr. 6, 2014 in PCT/JP2011/073044 (English translation only).
(Continued)

*Primary Examiner* — Erick Solis
*Assistant Examiner* — Robert Werner
(74) *Attorney, Agent, or Firm* — Oblon, McClelland, Maier & Neustadt, L.L.P.

(57) ABSTRACT

The required fuel supply amount of an internal combustion engine is reduced by limiting the throttle opening when a high-pressure fuel pump is required to discharge fuel that exceeds the fuel delivery capacity thereof. Further, when the throttle opening is limited, the operation of a return valve, through which fuel and vapor thereof can be discharged from the high-pressure fuel pump, is prohibited. By performing the abovementioned control, a reduction in the fuel delivery amount of the high-pressure fuel pump due to the operation of the return valve is prevented when there is a possibility that the fuel deliver amount of the high-pressure fuel pump runs short and the fuel supply amount of the internal combustion engine runs short.

7 Claims, 3 Drawing Sheets

(52) U.S. Cl.
CPC .... *F02D 41/3863* (2013.01); *F02D 2041/226* (2013.01); *Y02T 10/42* (2013.01)

(58) Field of Classification Search
CPC ............. F02M 63/0245; F02M 63/005; F02M 63/0052; F02M 59/102; F02M 59/366; F02M 2200/04
USPC ....... 123/445, 446, 457, 458, 461, 510, 511, 123/512, 514
See application file for complete search history.

(56) References Cited

FOREIGN PATENT DOCUMENTS

| | | | |
|---|---|---|---|
| JP | 11-257188 | | 9/1999 |
| JP | 2005-36721 | | 2/2005 |
| JP | 2005036721 A | * | 2/2005 |
| JP | 2005-106007 | | 4/2005 |
| JP | 2008-180208 | | 8/2008 |
| JP | 2008190342 A | * | 8/2008 |
| JP | 2009-62827 | | 3/2009 |
| JP | 2010-38143 | | 2/2010 |
| JP | 2011-27041 | | 2/2011 |

OTHER PUBLICATIONS

International Search Report issued Nov. 1, 2011, in PCT/JP11/073044 filed Oct. 6, 2011.
Office Action issued Jul. 6, 2016 in Chinese Patent Application No. 201180073960.5.

* cited by examiner

CONTROL DEVICE FOR INTERNAL COMBUSTION ENGINE

TECHNICAL FIELD

The present invention relates to a control device for an internal combustion engine including a high-pressure fuel pump for pressurizing and delivering fuel and a return valve capable of discharging fuel and fuel vapor from the high-pressure fuel pump.

BACKGROUND ART

In a direct injection internal combustion engine, fuel is pressurized in a high-pressure fuel pump and delivered from the high-pressure fuel pump to a delivery pipe, which retains the fuel, and then distributed from the delivery pipe to injectors of respective cylinders, thus supplying the fuel to the engine. The fuel delivery capacity of the high-pressure fuel pump may be lowered by increase in fuel leakage as the pump deteriorates over time. The lowered fuel delivery capacity of the high-pressure fuel pump causes insufficient fuel supply when the engine is in a full load operating state, which maximizes the amount of requested fuel supply. As a result, the air-fuel ratio of air-fuel mixture burned by the engine becomes lean, thus causing misfire, engine stall, or excessively heated catalyst.

Conventionally, to solve this problem, Patent Document 1 proposes a technique to avoid insufficient fuel supply by limiting the opening degree of the throttle valve of an internal combustion engine, which is the throttle opening degree, when it is determined that the fuel delivery capacity of a high-pressure fuel pump has lowered through deterioration of the pump over time. In an internal combustion engine performing air-fuel ratio control, the fuel supply amount is adjusted in correspondence with the intake air amount such that the air-fuel ratio of the air-fuel mixture delivered into a combustion chamber matches a target value. Accordingly, by decreasing the intake air amount through limitation of the throttle opening degree, the fuel supply amount necessary for ensuring an optimal air-fuel ratio is reduced. As a result, a lean air-fuel ratio is avoided even after the fuel delivery capacity of the high-pressure fuel pump is lowered.

PRIOR ART DOCUMENTS

Patent Documents

Patent Document 1: Japanese Laid-Open Patent Publication No. 2005-036721

SUMMARY OF THE INVENTION

Problems that the Invention is to Solve

Some high-pressure fuel pumps include a return valve for discharging fuel and fuel vapor from a high-pressure fuel pump. In one such high-pressure fuel pump having a return valve, the return valve is actuated to discharge fuel vapor from the high-pressure fuel pump when the interior of the high-pressure fuel pump is filled with fuel vapor.

In such a high-pressure fuel pump, which includes a return valve, in some cases, the return valve is actuated even when the high-pressure fuel pump is requested to perform a fuel delivery that exceeds its fuel delivery capacity. Actuation of the return valve reduces the fuel delivery amount of the high-pressure fuel pump by the amount corresponding to the amount of the fuel discharged by the return valve. This further increases the shortage of the fuel supply amount of the internal combustion engine. As a result, once the return valve is actuated, insufficient fuel supply may occur even if the throttle opening degree is limited to decrease the requested fuel supply amount of the engine.

Accordingly, it is an objective of the present invention to provide a control device for an internal combustion engine that suppresses, in a desirable manner, insufficient fuel supply to the engine due to an insufficient fuel delivery amount of a high-pressure fuel pump.

Means for Solving the Problems

To achieve the foregoing objective, a control device according to the present invention is applied to an internal combustion engine having a high-pressure fuel pump for pressurizing and delivering fuel and a return valve capable of discharging fuel and vapor of the fuel from the high-pressure fuel pump. When the high-pressure fuel pump is requested to perform a fuel delivery that exceeds its fuel delivery capacity, the control device limits actuation of the return valve.

In the present invention having the above-described configuration, actuation of the return valve is limited when the high-pressure fuel pump is requested to perform a fuel delivery that exceeds its fuel delivery capacity. This reduces or prohibits discharge of fuel or fuel vapor from the high-pressure fuel pump. Accordingly, when the fuel delivery amount of the high-pressure fuel pump is smaller than the requested value, decrease of the fuel delivery amount caused by actuation of the return valve is unlikely to occur. This makes it unlikely that an insufficient amount of fuel supplied to the internal combustion engine will be caused by an insufficient amount of fuel delivered by the high-pressure fuel pump.

An insufficient fuel supply amount of the engine caused by an insufficient fuel delivery amount of the high-pressure fuel pump can be avoided by limiting the opening degree of the throttle valve (the throttle opening degree) of the engine. However, if the return valve is actuated, the fuel delivery amount of the high-pressure fuel pump decreases even when the throttle opening degree is limited. In this case, even though the limited throttle opening degree decreases the requested fuel supply amount of the engine, the fuel supply amount of the engine may become insufficient. Accordingly, even when the throttle opening degree is limited, actuation of the return valve should be limited to make it unlikely that an insufficient amount of fuel supplied to the engine will be caused by an insufficient amount of fuel delivered by the high-pressure fuel pump.

To achieve the foregoing objective, another control device according to the present invention is applied to an internal combustion engine having a high-pressure fuel pump for pressurizing and delivering fuel and a return valve capable of discharging fuel and vapor of the fuel from the high-pressure fuel pump. The control device limits the opening degree of a throttle valve of the engine when a requested fuel supply amount of the engine is great. When the opening degree of the throttle valve is limited, the control device limits actuation of the return valve.

In the invention, which is configured as described above, if the requested fuel supply amount of the engine is great to such an extent that the high-pressure fuel pump cannot provide a necessary amount of fuel, the throttle opening degree is limited to decrease the requested fuel supply amount of the engine. However, if the return valve is actuated, the fuel delivery amount of the high-pressure fuel pump decreases even when the throttle opening degree is limited. This may cause an insufficient fuel supply amount even though the limited throttle opening degree decreases the requested fuel supply amount of the engine. However, in the invention, actuation of the return valve is limited when the throttle opening degree is limited. It is thus unlikely that the fuel delivery amount of the high-pressure fuel pump is reduced through actuation of the return valve. This makes it unlikely that an insufficient amount of fuel supplied to the engine will be caused by an insufficient amount of fuel delivered by the high-pressure fuel pump.

Limitation of the actuation of the return valve may include prohibition of the actuation of the return valve, decreasing the amount of the fuel and the fuel vapor discharged from the high-pressure fuel pump at the time when the return valve operates, and changing a condition for actuating the return valve such that the return valve is harder to actuate.

MODES FOR CARRYING OUT THE INVENTION

First Embodiment

Figure 1:
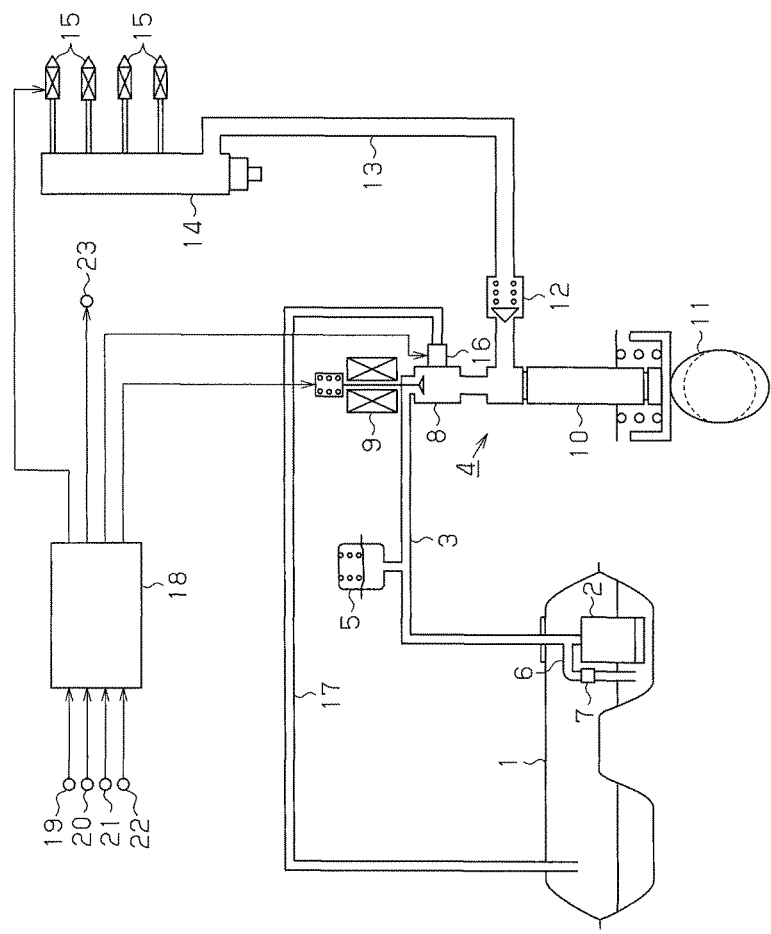
FIG. 1 is a diagram schematically showing the configuration of a high-pressure fuel system for an internal combustion engine according to a first embodiment of the present invention.

A control device for an internal combustion engine according to a first embodiment of the present invention will now be described in detail with reference to FIGS. 1 and 2. FIG. 1 illustrates the configuration of a high-pressure fuel system for an internal combustion engine in which the control device of the first embodiment is employed.

As shown in FIG. 1, a fuel tank 1 includes a feed pump 2, which draws fuel from the fuel tank 1. The feed pump 2 is connected to a high-pressure fuel pump 4 through a feed passage 3. The feed passage 3 has a pulsation damper 5 to restrict pulsation of fuel pressure in the feed passage 3.

A relief passage 6 is connected to the feed passage 3 to return the fuel from the feed passage 3 to the fuel tank 1. A check valve 7 is mounted in the relief passage 6 and opens when the fuel pressure in the feed passage 3 is greater than or equal to a certain value.

The high-pressure fuel pump 4 includes a pressurization chamber 8, which receives the fuel that has been delivered from the feed pump 2 via the feed passage 3. The high-pressure fuel pump 4 also has an electromagnetic spill valve 9, which selectively opens and closes the pressurization chamber 8 with respect to the feed passage 3. The high-pressure fuel pump 4 further includes a plunger 10, which presses the fuel in the pressurization chamber 8. The plunger 10 is reciprocally raised and lowered by a cam 11, which is arranged in a camshaft of the engine. The plunger 10 presses the fuel in the pressurization chamber 8 when raised.

The pressurization chamber 8 of the high-pressure fuel pump 4 is connected to a high-pressure fuel pipe 13 through a check valve 12, which opens when the fuel pressure in the pressurization chamber 8 is greater than or equal to a certain value. The high-pressure fuel pipe 13 connects the pressurization chamber 8 to a delivery pipe 14, which retains the fuel that has been supplied from the high-pressure fuel pump 4. Injectors 15 of cylinders of the engine are connected to the delivery pipe 14.

An electromagnetically driven type return valve 16 is arranged in the high-pressure fuel pump 4. The return valve 16 is actuated in response to an actuation signal and discharges fuel and fuel vapor from the pressurization chamber 8. After having been delivered from the pressurization chamber 8 through actuation of the return valve 16, the fuel and fuel vapor are introduced into the fuel tank 1 through the return passage 17.

The high-pressure fuel pump 4 of the high-pressure fuel system, which is configured as described above, is controlled by an electronic control unit 18 for controlling the internal combustion engine as a whole. Various types of sensors are connected to the electronic control unit 18 and detect operating conditions of the engine. The sensors include a coolant temperature sensor 19 for detecting the temperature of coolant of the engine (the coolant temperature), an intake air temperature sensor 20 for detecting the temperature of the intake air of the engine (the intake air temperature), an air flow meter 21 for detecting the intake air amount of the engine, and an accelerator position sensor 22 for detecting the operating amount of the accelerator pedal by the driver (the accelerator operating amount).

Based on detection results of the sensors, the electronic control unit 18 controls the fuel injection amount of each of the injectors 15, the opening degree of a throttle valve 23 (the throttle opening degree), and the fuel delivery amount of the high-pressure fuel pump 4.

Specifically, to control the fuel injection amount of each injector 15, the electronic control unit 18 calculates the fuel injection amount of the injector 15 based on the intake air amount detected by the air flow meter 21. In other words, the intake air amount is divided by a target air-fuel ratio and the obtained value is corrected in correspondence with the circumstances to determine the fuel injection amount. For example, when the ignition timing of the engine is retarded greatly, the fuel injection amount is determined through increasing correction to decrease the exhaust gas temperature to make it unlikely that excessive catalyst heating is caused by the retarded ignition timing. The electronic control unit 18 then controls the injectors 15 of the cylinders to inject fuel by the determined fuel injection amount.

Control on the fuel delivery amount of the high-pressure fuel pump 4 will hereafter be described. Even when the plunger 10 rises in the high-pressure fuel pump 4, the fuel pressed by the plunger 10 in the pressurization chamber 8 is simply returned to the feed passage 3 without being delivered into the high-pressure fuel pipe 13 as long as the electromagnetic spill valve 9 is open. In contrast, if the electromagnetic spill valve 9 is closed when the plunger 10 rises, the fuel is caught in the pressurization chamber 8 and pressed and pressurized by the plunger 10. When the pressure of the fuel in the pressurization chamber 8 increases sufficiently, the check valve 12 opens and delivers the pressurized fuel in the pressurization chamber 8 into the high-pressure fuel pipe 13. Accordingly, the fuel delivery amount of the high-pressure fuel pump 4 is adjusted by changing the closing timing of the electromagnetic spill valve 9 in the time period in which the plunger 10 rises. In other words, by advancing the closing timing of the electromagnetic spill valve 9, the fuel delivery amount of the high-pressure fuel pump 4 is increased. The fuel delivery amount of the high-pressure fuel pump 4 is decreased by retarding the closing timing of the electromagnetic spill valve 9. Accordingly, the electronic control unit 18 uses the above-described calculated fuel injection amount of each injector 15 to calculate the closing timing of the electromagnetic spill valve 9 necessary for ensuring the fuel delivery amount that ensures the fuel delivery by the calculated fuel injection amount. In this manner, the electronic control unit 18 controls the fuel delivery amount of the high-pressure fuel pump 4.

To control the throttle opening degree, the electronic control unit 18 calculates the throttle opening degree necessary for ensuring engine output corresponding to a driver's request based on the accelerator operating amount detected by the accelerator position sensor 22. As the throttle opening degree increases, the intake air amount increases to raise the fuel injection amount. However, there is a limit to the amount of the fuel that can be delivered by the high-pressure fuel pump 4. As a result, when the throttle opening degree is increased to exceed a certain value, the fuel delivery capacity of the high-pressure fuel pump 4 cannot allow the high-pressure fuel pump 4 to supply a necessary amount of fuel to each injector 15. To solve this problem, an upper limit value $\alpha$ is employed for the throttle opening degree that is actually set. If the throttle opening degree calculated based on the accelerator operating amount exceeds the upper limit value $\alpha$, the throttle opening degree is limited such that the calculated throttle opening degree becomes smaller than or equal to the upper limit value $\alpha$.

The fuel delivery capacity of the high-pressure fuel pump 4 may be lowered by fuel leakage from the pressurization chamber 8, which increases due to deterioration of the high-pressure fuel pump 4 over time. To solve this problem, the upper limit value $\alpha$ of the throttle opening degree is set to such a value that, even when the fuel delivery capacity of the high-pressure fuel pump 4 is lowered through deterioration over time, the fuel supply to the engine does not become insufficient.

When the fuel injection amount is subjected to the increasing correction, the fuel injection amount may become great, even if the throttle opening degree is not significantly great, to such an extent that the high-pressure fuel pump 4 is requested to perform a fuel delivery that exceeds its fuel delivery capacity. Also, the intake air amount may increase under a high atmospheric pressure, even when the throttle opening degree is not significantly great. This may also increase the fuel injection amount and thus request the high-pressure fuel pump 4 to perform a fuel delivery that exceeds its fuel delivery capacity. To solve these problems, the electronic control unit 18 sets a value smaller than the usual value as the upper limit value $\alpha$ of the throttle opening degree when the calculated fuel injection amount is greater than or equal to a certain value. In this manner, the electronic control unit 18 ensures that the fuel supply to the engine is maintained without becoming insufficient.

When the high-pressure fuel pump 4 is heated to a high temperature, the fuel in the pressurization chamber 8 is heated to generate vapor. Accordingly, the electronic control unit 18 actuates the return valve 16 when the temperature of the high-pressure fuel pump 4 is high, thus discharging the vapor from the high-pressure fuel pump 4. Operation of the return valve 16 is controlled in the manner described below.

Figure 2:
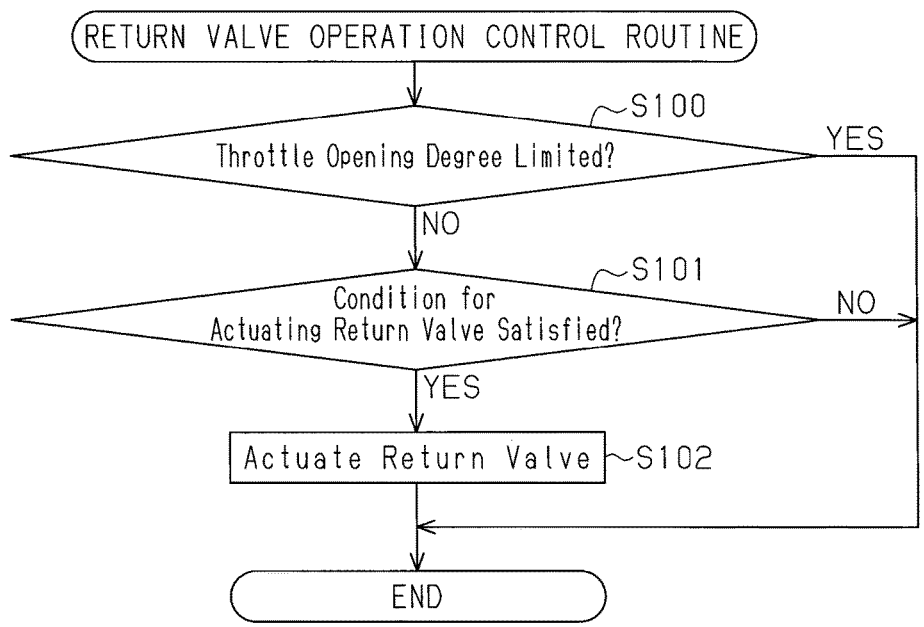
FIG. 2 is a flowchart representing a return valve operation control routine employed in the first embodiment.

Operation of the return valve 16 is controlled through a procedure represented by a return valve operation control routine, which is illustrated in FIG. 2. The procedure of the routine is performed by the electronic control unit 18 in a periodically repeated manner at predetermined control cycles. Specifically, the electronic control unit 18 carries out the procedure not only when the internal combustion engine is in operation but also when the engine is not running.

The procedure of the routine is started by determining whether the throttle opening degree is limited in step S100. In other words, in step S100, it is determined whether the throttle opening degree calculated based on the accelerator operating amount exceeds the upper limit value $\alpha$ and the throttle opening degree that is actually set is limited to a value smaller than or equal to the upper limit value $\alpha$.

If the throttle opening degree is limited (S100: YES), the current execution of the procedure of the routine is ended. In this case, actuation of the return valve 16 is prohibited regardless of whether the condition for actuating the return valve 16 is satisfied.

In contrast, if the throttle opening degree is not limited (S100: NO), step S101 of the procedure is performed. In step S101, it is determined whether the condition for actuating the return valve 16 is satisfied. The condition for actuating the return valve 16 is satisfied if the engine is in operation and the temperature of the high-pressure fuel pump 4 is high or if the engine is not running and the temperature of the high-pressure fuel pump 4 is high. The temperature of the high-pressure fuel pump 4 at the time when the engine is in operation is estimated from the current coolant temperature, the intake air temperature, and the engine lubricant temperature. The temperature of the high-pressure fuel pump 4 at the time when the engine is not running is estimated from the current coolant temperature and the engine lubricant temperature and the intake air temperature at the time when the engine is stopped.

If the condition for actuating the return valve 16 is not satisfied (S101: NO), the current execution of the procedure of the routine is ended. In contrast, when the condition for actuating the return valve 16 is met (S100: YES), step S102 is carried out and, in step S102, the return valve 16 is actuated. The current execution of the procedure of the routine is then ended.

Operation of the electronic control unit 18 related to the return valve operation control will hereafter be described.

When the throttle opening degree calculated based on the accelerator operating amount exceeds the upper limit value $\alpha$, the fuel injection amount, which is the requested fuel supply amount of the engine, increases. The high-pressure fuel pump 4 is thus requested to perform a fuel delivery that exceeds the fuel delivery capacity. This may cause insufficient fuel supply to the engine. To solve this problem, the electronic control unit 18 limits the throttle opening degree to a value smaller than or equal to the upper limit value $\alpha$ such that the insufficient fuel supply is avoided.

When the throttle opening degree is not limited in the above-described manner and the high-pressure fuel pump 4 is heated such that the condition for actuating the return valve 16 is satisfied, the electronic control unit 18 actuates the return valve 16. The return valve 16 thus discharges the vapor generated in the heated high-pressure fuel pump 4.

When the opening degree of the throttle opening degree is limited, the requested fuel supply amount of the engine is decreased through such limitation. However, the high-pressure fuel pump 4 is requested to carry out a fuel delivery that is close to or beyond its fuel delivery capacity. In this state, the electronic control unit 18 prohibits actuation of the return valve 16 regardless of whether the condition for actuating the return valve 16 is satisfied. Accordingly, as long as the throttle opening degree is limited, the fuel delivery amount of the high-pressure fuel pump 4 is prevented from being decreased through actuation of the return valve 16. The fuel supply to the engine is thus unlikely to become insufficient due to decrease of the fuel delivery amount.

The control device for an internal combustion engine, which has been described above, has the advantage described below.

(1) In the first embodiment, when the high-pressure fuel pump 4 is requested to perform a fuel delivery that exceeds its fuel delivery capacity and the throttle opening degree is limited to avoid the insufficient fuel supply caused by the request, actuation of the return valve 16 is prohibited. As a result, the fuel supply to the internal combustion engine is made unlikely, in a desirable manner, to become insufficient due to decrease of the fuel delivery amount of the high-pressure fuel pump 4.

Second Embodiment

Figure 3:
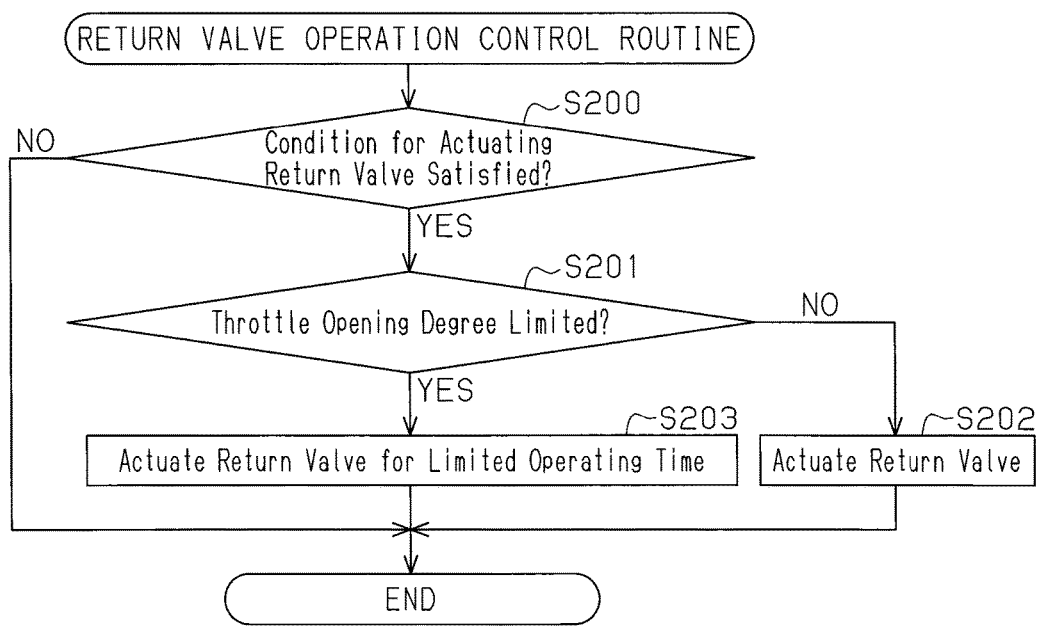
FIG. 3 is a flowchart representing a return valve operation control routine employed in a second embodiment of the invention.

A control device for an internal combustion engine according to a second embodiment according to the present invention will now be described with reference to FIG. 3. Same or like reference numerals are given to components of the second embodiment and components of a third embodiment, which will be described later, that are the same as or like corresponding components of the first embodiment. Detailed description of these components is omitted herein.

In the first embodiment, by prohibiting actuation of the return valve 16 when the throttle opening degree is limited, insufficient fuel supply to the internal combustion engine caused by an insufficient fuel delivery amount of the high-pressure fuel pump 4 is made unlikely to occur. However, even without totally prohibiting the actuation of the return valve 16, decrease of the fuel delivery amount of the high-pressure fuel pump 4 caused by the actuation of the return valve 16 is avoided simply by reducing the amount of fuel and fuel vapor discharged from the high-pressure fuel pump 4 when the return valve 16 is in actuation. In the second embodiment, when the throttle opening degree is limited, insufficient fuel supply to the engine caused by an insufficient fuel delivery amount of the high-pressure fuel pump 4 is made unlikely to happen by decreasing the amount of the fuel and fuel vapor discharged from the high-pressure fuel pump 4 when the return valve 16 is in actuation.

Operation control on the return valve 16 of the second embodiment will hereafter be described. The operation control on the return valve 16 of the second embodiment is carried out through a procedure represented by a return valve operation control routine, which is illustrated in FIG. 3. The procedure of the routine is performed by the electronic control unit 18 in a periodically repeated manner at predetermined control cycles. Specifically, the electronic control unit 18 carries out the procedure not only when the internal combustion engine is in operation but also when the engine is not running.

The procedure of the routine is started by determining whether a condition for actuating the return valve 16 is satisfied in step S200. The condition for actuating the return valve 16 is the same as the condition for actuating the return valve 16 of the first embodiment. If the condition for actuating the return valve 16 is not satisfied (S200: NO), the current execution of the procedure of the routine is ended.

In contrast, when the condition for actuating the return valve 16 is met (S200: YES), step S201 is performed. In step S201, it is determined whether the throttle opening degree is limited.

If the throttle opening degree is not limited (S201: NO), step S202 is performed and, in step S202, the return valve 16 is actuated. The current execution of the procedure of the routine is then ended. The return valve 16 is maintained in actuation as long as the condition for actuating the return valve 16 is satisfied.

In contrast, when the throttle opening degree is limited (S201: YES), step S203 is carried out. In step S203, the return valve 16 is actuated for a limited operating time. Afterwards, the current execution of the procedure of the routine is ended. Specifically, the return valve 16 is stopped immediately after the predetermined operating time regardless of whether the condition for actuating the return valve 16 is continuously satisfied.

Operation of the electronic control unit 18 related to the return valve operation control of the second embodiment will hereafter be described.

In the second embodiment, when the throttle opening degree is not limited, the electronic control unit 18 actuates the return valve 16 if a condition for actuating the return valve 16 is satisfied. The return valve 16 thus discharges the vapor generated in the heated high-pressure fuel pump 4. In this case, the return valve 16 is maintained in the actuated state until the condition for actuating the return valve 16 is not satisfied any more.

The electronic control unit 18 actuates the return valve 16 if the condition for the actuating the return valve 16 is satisfied also when the throttle opening degree is limited. However, in this case, the return valve 16 is actuated only for the limited operating time and stopped immediately after the predetermined time has elapsed regardless of whether the condition for actuating the return valve 16 is continuously satisfied. This decreases the amount of the fuel and fuel vapor discharged from the high-pressure fuel pump 4 through actuation of the return valve 16 compared with the corresponding amount at the time when the throttle opening degree is not limited. As a result, the fuel delivery amount of the high-pressure fuel pump 4 is decreased through actuation of the return valve 16 only to a limited extent.

The control device for an internal combustion engine of the second embodiment has the advantage described below.

(2) In the second embodiment, when the high-pressure fuel pump 4 is requested to perform a fuel delivery that exceeds its fuel delivery capacity and the throttle opening degree is limited to avoid insufficient fuel supply caused by the request, the amount of the vapor and vapor discharged from the high-pressure fuel pump 4 at the time when the return valve 16 operates is decreased. This limits the decrease of the fuel delivery amount of the high-pressure fuel pump 4 caused through actuation of the return valve 16 at the time when the throttle opening degree is limited. As a result, insufficient fuel supply to the internal combustion engine caused by an insufficient fuel delivery amount of the high-pressure fuel pump 4 is made unlikely to occur in a desirable manner.

Third Embodiment

Figure 4:
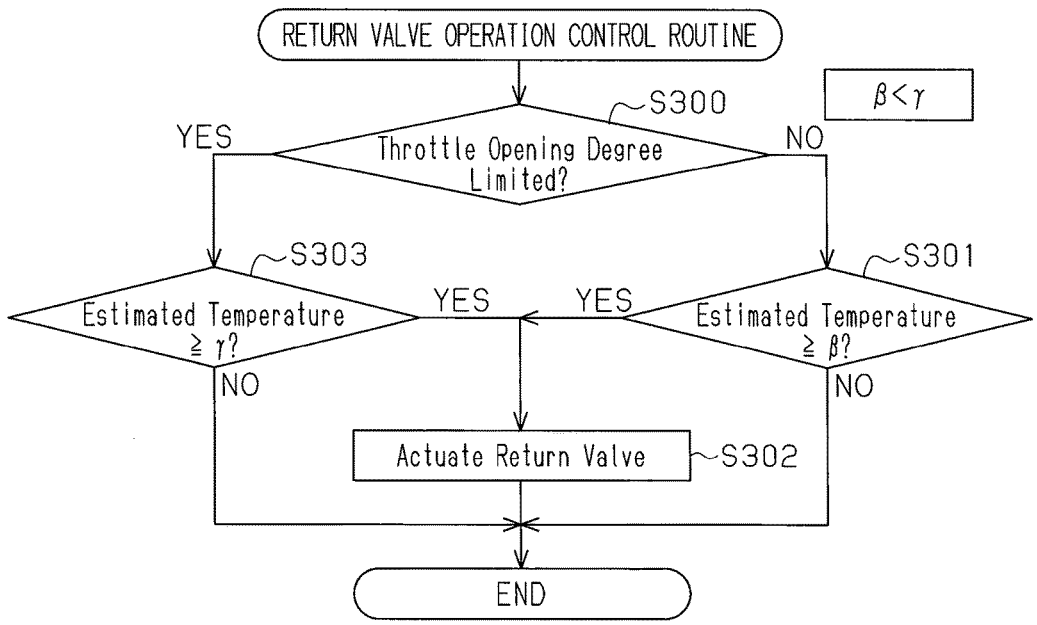
FIG. 4 is a flowchart representing a return valve operation control routine employed in a third embodiment of the invention.

A control device for an internal combustion engine according to a third embodiment of the present invention will now be described in detail with reference to FIG. 4.

In the above illustrated embodiments, when the throttle opening degree is limited, insufficient fuel supply to the internal combustion engine caused by an insufficient fuel delivery amount of the high-pressure fuel pump 4 is made unlikely to happen in a desirable manner by prohibiting actuation of the return valve 16 or decreasing the discharge amount of fuel and vapor when the return valve 16 operates. However, even if the return valve 16 is actuated in a normal manner when the throttle opening degree is limited, insufficient fuel supply to the engine can be avoided by decreasing the frequency of actuation of the return valve 16. Accordingly, in the third embodiment, the condition for actuating the return valve 16 is changed depending on whether the throttle opening degree is limited such that actuation of the return valve 16 is permitted in a limited manner if the throttle opening degree is limited. In this manner, the frequency of actuation of the return valve 16 at the time when the throttle opening degree is limited is decreased.

Operation control on the return valve 16 of the third embodiment will hereafter be described. The operation control on the return valve 16 of the third embodiment is carried out through a procedure represented by a return valve operation control routine, which is illustrated in FIG. 4. The procedure of the routine is performed by the electronic control unit 18 in a periodically repeated manner at predetermined control cycles. Specifically, the electronic control unit 18 carries out the procedure not only when the internal combustion engine is in operation but also when the engine is not running.

The procedure of the routine is started by determining whether the throttle opening degree is limited in step S300.

If the throttle opening degree is not limited (S300: NO), step S301 is performed. In step S301, it is determined whether the estimated temperature of the high-pressure fuel pump 4 is greater than or equal to the reference value $\beta$. The estimated temperature of the high-pressure fuel pump 4 is determined based on the coolant temperature, the intake air temperature, and the engine lubricant temperature. If the estimated temperature of the high-pressure fuel pump 4 is greater than or equal to the reference value $\beta$ (S301: YES), step S302 is carried out and, in step S302, the return valve 16 is actuated. The current execution of the procedure of the routine is then ended. In contrast, if the estimated temperature of the high-pressure fuel pump 4 is smaller than the reference value $\beta$ (S301: NO), the return valve 16 is not actuated and the current execution of the procedure of the routine is then ended. As has been described, the condition for actuating the return valve 16 at the time when the throttle opening degree is not limited is that the estimated temperature of the high-pressure fuel pump 4 is greater than or equal to the reference value $\beta$.

In contrast, if the throttle opening degree is limited (S300: YES), step S303 is performed. In step S303, it is determined whether the estimated temperature of the high-pressure fuel pump 4 is greater than or equal to the reference value $\gamma$. The reference value $\gamma$ is set to be greater than the aforementioned reference value $\beta$. If the estimated temperature of the high-pressure fuel pump 4 is greater than or equal to the reference value $\gamma$ (S303: YES), step S302 is carried out and, in step S302, the return valve 16 is actuated. The current execution of the procedure of the routine is then ended. In contrast, if the estimated temperature of the high-pressure fuel pump 4 is smaller than the reference value $\gamma$ (S303: NO), the return valve 16 is not actuated and the current execution of the procedure of the routine is then ended. As has been described, the condition for actuating the return valve 16 at the time when the throttle opening degree is limited is that the estimated temperature of the high-pressure fuel pump 4 is greater than or equal to the reference value $\gamma$.

The operation of the electronic control unit 18 related to the return valve operation control of the third embodiment will hereafter be described.

In the third embodiment, when the throttle opening degree is not limited, the electronic control unit 18 actuates the return valve 16 if the condition that the estimated temperature of the high-pressure fuel pump 4 is greater than or equal to the reference value $\beta$, which is the condition for actuating the return valve 16, is satisfied. In contrast, when the throttle opening degree is limited, the electronic control unit 18 actuates the return valve 16 if the condition that the estimated temperature of the high-pressure fuel pump 4 is greater than or equal to the reference value $\gamma$, which is greater than the reference value $\beta$, is satisfied as the condition for actuating the return valve 16. As a result, when the throttle opening degree is limited, the return valve 16 is not actuated unless the temperature of the high-pressure fuel pump 4 is comparatively high. In other words, in the third embodiment, the condition for actuating the return valve 16 is changed depending on whether the throttle opening degree is limited such that actuation of the return valve 16 is permitted in a comparatively limited manner when the throttle opening degree is limited.

Accordingly, in the third embodiment, the frequency of actuation of the return valve 16 is decreased when the throttle opening degree is limited. This also decreases the frequency by which the fuel delivery amount of the high-pressure fuel pump 4 is decreased through actuation of the return valve 16. As a result, insufficient fuel supply to the internal combustion engine caused by an insufficient fuel delivery amount of the high-pressure fuel pump 4 occurs only with a limited frequency.

The control device for an internal combustion engine of the third embodiment has the advantage described below.

(3) In the third embodiment, when the high-pressure fuel pump 4 is requested to perform a fuel delivery that exceeds its fuel delivery capacity and the throttle opening degree is limited to avoid insufficient fuel supply caused by the request, the condition for actuating the return valve 16 is changed to permit actuation of the return valve 16 in a limited manner. This makes it unlikely that an insufficient amount of fuel supplied to the internal combustion engine will be caused by an insufficient amount of fuel delivered by the high-pressure fuel pump 4.

The illustrated embodiments may be modified to the forms described below.

In the second embodiment, the amount of fuel and vapor discharged from the high-pressure fuel pump 4 at the time when the return valve 16 operates is decreased by limiting the operating time of the return valve 16. However, the aforementioned discharge amount of fuel and vapor from the high-pressure fuel pump 4 may be reduced by any suitable method other than limitation of the operating time of the return valve 16. For example, such decrease of the amount of fuel and vapor discharged from the high-pressure fuel pump 4 at the time when the return valve 16 operates may be achieved by intermittently actuating the return valve 16. Alternatively, the return valve 16 may have an adjustable opening degree that can be reduced to decrease the aforementioned discharge amount of the fuel and vapor from the high-pressure fuel pump 4.

In the third embodiment, the condition for actuating the return valve 16 is set based on the estimated temperature of the high-pressure fuel pump 4. Specifically, compared with when the throttle opening degree is not limited, actuation of the return valve 16 is permitted at a high estimated temperature of the high-pressure fuel pump 4 when the throttle opening degree is limited. This decreases the frequency of actuation of the return valve 16 at the time when the throttle opening degree is limited. However, any suitable condition other than the aforementioned condition may be employed as long as the condition is changed depending on whether the throttle opening degree is limited such that actuation of the return valve 16 is permitted in a comparatively limited manner when the throttle opening degree is limited. This also decreases the frequency of actuation of the return valve 16 when the throttle opening degree is limited.

The conditions for actuating the return valve 16 may be changed to any other suitable conditions in the first and second embodiments. In any case, optimal operation of the high-pressure fuel pump 4 can be maintained by discharging vapor from the high-pressure fuel pump 4 as long as the return valve 16 is actuated when the vapor is generated in the high-pressure fuel pump 4. Also in these cases, when the throttle opening degree is limited, insufficient fuel supply to the internal combustion engine caused by an insufficient fuel delivery amount of the high-pressure fuel pump 4 is made unlikely to happen in a desirable manner by prohibiting actuation of the return valve 16 or decreasing the discharge amount of fuel and vapor at the time when the return valve 16 operates when the throttle opening degree is limited.

In each of the illustrated embodiments, the upper limit value of the throttle opening degree is variable in correspondence with the fuel injection amount. However, a fixed upper limit value may be employed for the throttle opening degree. Also in this case, as long as an appropriate upper limit value is set, the requested fuel supply amount of the engine is reduced to avoid insufficient fuel supply to the engine.

In the illustrated embodiments, the upper limit value of the throttle opening degree is set all the time. However, the throttle opening degree may have an upper limit value only when the requested fuel injection amount of the engine is great and thus may cause an insufficient fuel delivery amount of the high-pressure fuel pump 4. Also in this case, when the high-pressure fuel pump 4 is requested to perform a fuel delivery that exceeds its fuel delivery capacity, the requested fuel supply amount of the engine is reduced to decrease shortage of the fuel supply amount.

In the illustrated embodiments, by setting the upper limit value of the throttle opening degree, the throttle opening degree is limited when the high-pressure fuel pump 4 is requested to perform a fuel delivery that exceeds its fuel delivery capacity. However, such limitation of the throttle opening degree may be achieved by any suitable method other than setting the upper limit value. For example, when the requested fuel injection amount of the engine exceeds a certain value, the throttle opening degree may be reduced by a certain amount. Also in this case, the requested fuel supply amount of the engine is decreased to reduce shortage of fuel supply.

In the illustrated embodiments, the throttle opening degree is limited when the high-pressure fuel pump 4 is requested to a perform fuel delivery that exceeds its fuel delivery capacity. However, such limitation of the throttle opening degree does not necessarily have to be performed. Also in this case, when the high-pressure fuel pump 4 is requested to perform a fuel delivery that exceeds its fuel delivery capacity, actuation of the return valve 16 may be limited to make it unlikely that shortage of the fuel supply amount of the engine is increased through decrease of the fuel delivery amount of the high-pressure fuel pump 4 caused by actuation of the return valve 16.

The control device for an internal combustion engine according to the present invention may be used for an internal combustion engine having a high-pressure fuel system configured differently from the system illustrated in FIG. 1, in the same manner as the illustrated embodiments. That is, the control device according to the invention is usable in any other suitable internal combustion engine as long as the engine includes a high-pressure fuel pump for pressurizing and delivering fuel and a return valve capable of discharging fuel and fuel vapor from the high-pressure fuel pump. By employing the control device according to the invention, insufficient fuel supply to the internal combustion engine caused by an insufficient fuel delivery amount of the high-pressure fuel pump is made unlikely to occur in a desirable manner.

DESCRIPTION OF THE REFERENCE NUMERALS

1 . . . fuel tank, 2 . . . feed pump, 3 . . . feed passage, 4 . . . high-pressure fuel pump, 5 . . . pulsation damper, 6 . . . relief passage, 7 . . . check valve, 8 . . . pressurization chamber, 9 . . . electromagnetic spill valve, 10 . . . plunger, 11 . . . cam, 12 . . . check valve, 13 . . . high-pressure fuel pipe, 14 . . . delivery pipe, 15 . . . injector, 16 . . . return valve, 17 . . . return passage, 18 . . . electronic control unit, 19 . . . coolant temperature sensor, 20 . . . intake air temperature sensor, 21 . . . air flow meter, 22 . . . accelerator position sensor, 23 . . . throttle valve

The invention claimed is:

1. A control system for an internal combustion engine comprising:
   an electronic control unit;
   a feed pump configured to send fuel to a feed passage;
   an electromagnetic spill valve configured to selectively open and close the feed passage;
   a high-pressure fuel pump configured to pressurize and deliver fuel introduced from the feed passage; and
   a return valve, wherein the electronic control unit is configured to
   actuate the return valve to discharge fuel and vapor of the fuel from the high-pressure fuel pump through a return passage when a predetermined condition for actuating the return valve is satisfied, the predetermined condition indicating generation of the vapor in the high-pressure fuel pump, and
   when the high-pressure fuel pump is requested to perform a fuel delivery that exceeds its fuel delivery capacity, limit actuation of the return valve such that discharge of the fuel and the fuel vapor through the return passage is limited compared to a case in which such a request is absent,
   wherein the predetermined condition is that the temperature of the high-pressure fuel pump is greater than or equal to a reference value, and limiting the actuation of the return valve includes increasing the reference value.

2. The control system according to claim 1, wherein, when the high-pressure fuel pump is requested to perform a fuel delivery that exceeds its fuel delivery capacity, the electronic control unit is configured to limit the opening degree of a throttle valve of the engine.

3. A control system for an internal combustion engine comprising:
   an electronic control unit;
   a feed pump configured to send fuel to a feed passage;
   an electromagnetic spill valve configured to selectively open and close the feed passage;
   a high-pressure fuel pump configured to pressurize and deliver fuel introduced from the feed passage; and
   a return valve, wherein the electronic control unit is configured to
   limit the opening degree of a throttle valve of the engine when a requested fuel supply amount of the engine is greater than a predetermined allowable amount,
   actuate the return valve to discharge fuel and vapor of the fuel from the high-pressure fuel pump through a return passage when a predetermined condition for actuating the return valve is satisfied, the predetermined condition indicating generation of the vapor in the high-pressure fuel pump, and when the opening degree of the throttle valve is limited, limit actuation of the return valve such that discharge of the fuel and the fuel vapor through the return passage is limited compared to a case in which such limitation of the throttle valve opening degree is absent, wherein the predetermined condition is that the temperature of the high-pressure fuel pump is greater than or equal to a reference value, and the limiting actuation of the return valve includes increasing the reference value.

4. The control system according to claim 1, wherein the limiting actuation of the return valve includes prohibition of the actuation of the return valve.

5. The control system according to claim 1, wherein the limiting actuation of the return valve includes decreasing the amount of the fuel and the fuel vapor discharged by the return valve at the time when the return valve operates.

6. The control system according to claim 3, wherein the limiting actuation of the return valve includes prohibition of the actuation of the return valve.

7. The control system according to claim 3, wherein the limiting actuation of the return valve includes decreasing the amount of the fuel and the fuel vapor discharged by the return valve at the time when the return valve operates.

* * * * *